United States Patent
Pai et al.

(10) Patent No.: US 10,860,151 B1
(45) Date of Patent: Dec. 8, 2020

(54) SINGLE-LAYER PROJECTED CAPACITIVE TOUCH SENSOR WITH TWO BRIDGING AREAS

(71) Applicants: Chih-Chiang Pai, Taoyuan (TW);
Meng-Kuei Lin, Taoyuan (TW);
Chin-Fong Lin, Taoyuan (TW);
Chiu-Wen Chen, Taoyuan (TW)

(72) Inventors: Chih-Chiang Pai, Taoyuan (TW);
Meng-Kuei Lin, Taoyuan (TW);
Chin-Fong Lin, Taoyuan (TW);
Chiu-Wen Chen, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 16/527,039

(22) Filed: Jul. 31, 2019

(51) Int. Cl.
*G06F 3/044* (2006.01)

(52) U.S. Cl.
CPC .......... *G06F 3/0443* (2019.05); *G06F 3/0448* (2019.05); *G06F 2203/04111* (2013.01)

(58) Field of Classification Search
CPC .............. G06F 3/0416; G06F 3/04162; G06F 3/04164; G06F 3/0443; G06F 3/0448; G06F 2203/04111
See application file for complete search history.

(56) References Cited

U.S. PATENT DOCUMENTS

| | | | | |
|---|---|---|---|---|
| 2010/0144391 A1* | 6/2010 | Chang | ................. | G02F 1/13338 455/566 |
| 2014/0210784 A1* | 7/2014 | Gourevitch | .......... | H03K 17/962 345/174 |
| 2017/0160833 A1* | 6/2017 | Han | ....................... | G06F 3/0416 |
| 2018/0046276 A1* | 2/2018 | Hou | ..................... | G06F 3/04166 |
| 2019/0302912 A1* | 10/2019 | Pai | .......................... | G06F 3/041 |
| 2019/0364665 A1* | 11/2019 | Yang | ..................... | H05K 3/067 |

* cited by examiner

*Primary Examiner* — Priyank J Shah

(57) ABSTRACT

A capacitive touch sensor includes sensing columns. Each sensing column has a common sensing electrode and driving electrodes. The driving electrodes are divided into two groups, which are connected to contacts in two bridging areas through electrode wires. Each bridging area is covered by an insulation film with through holes corresponding to the contacts. Signal wires of the driving electrodes pass through the through holes to connect the contacts of the driving electrodes of the sensing columns, which are located in a line, to form a signal channel. The signal wires connecting the common sensing electrodes pass through one of the two bridging areas and insulatively intersect the signal wires of the driving electrodes of the signal channel. Electrode extending portions of the common sensing electrodes are extended to the other bridging area to insulatively intersect signal wires of the driving electrodes of the signal channel.

9 Claims, 10 Drawing Sheets

SINGLE-LAYER PROJECTED CAPACITIVE TOUCH SENSOR WITH TWO BRIDGING AREAS

TECHNICAL FIELD

The invention relates to projected capacitive touch sensors, particularly to a single-layer projected capacitive touch sensor based on independent-matrix sense elements.

RELATED ART

Projected capacitive touch sensors have a multitouch function, so they have been widely applied in various electronic devices. A projected capacitive touch sensor based on independent-matrix sense elements is composed of sensing columns arranged on a single-layer conductive film. Each sensing column has a common sensing electrode and driving electrodes. Each of the sensing electrode and the driving electrodes is connected to a contact through an electrode wire. The contacts are located at an outermost position of the touch panel and are connected with a flexible flat cable (FFC). As a result, a touch signal generated by the touch sensor can be transmitted to a signal processor. As shown in FIG. 7, all of both the sensing electrodes and the driving electrodes based on independent-matrix sense elements are arranged on a single conductive layer, and each electrode is connected to the contacts 10' at a peripheral position. The quantity of the contacts is numerous. This not only makes a size of the flexible flat cable connected thereto become relatively large but also easily causes poor contact of some contacts to result in malfunction of the touch sensor.

As shown in FIGS. 8 and 9, to reduce area of a bezel of a touch panel, a framework of independent-matrix sense elements with a bridging area is introduced. Such a framework arranges numerous contacts 10' of the sensing electrodes and the driving electrodes at a peripheral position of the touch panel, the contacts 10' are covered by an insulation film 20', through holes 30' are provided in the insulation film at positions corresponding to the contacts 10', and signal wires TX of the driving electrodes pass through the through holes 30' of the insulation film to electrically connect the contacts 10' in a line of the driving electrodes of all the sensing columns to form a signal channel. As a result, both a quantity of the contacts 10' connected with a flexible flat cable and a quantity of the signal wires in the bezel of the touch panel can be decreased and a width of the bezel can also be shortened. In such a framework, however, both the signal wires RX of the sensing electrodes and the signal wires TX of the driving electrodes are located in a single area. When such a framework is applied to touch panels with large size or high resolution, the number of both the signal wires RX of the sensing electrodes and the signal wires TX of the driving electrodes will substantially increase because of numerous sensing columns. A size of the bezel still cannot be effectively. This not only makes appearance of the bezel fat and poor, but also compresses an effective touch area.

To overcome the drawbacks of the above framework of independent-matrix sense elements with a bridging area, a framework of independent-matrix sense elements with two bridging areas has been introduced. The latter is similar to the former in fundamental structure. A primary difference between them is that two bridging areas are separately arranged at two opposite sides of the touch panel. Numerous driving electrodes on the touch sensing layer are divided into two groups and the two groups of driving electrodes are separately connected to contacts in the two bridging areas through electrode wires. An insulation film with through holes is added and signal wires of the driving electrodes connect contacts in a line of the driving electrodes to form a signal channel. Thus, the number of signal wires of the driving electrodes can be distributed to two sides of the touch panel to narrow a width of the bezel.

However, signal wires RX of the common sensing electrodes of the sensing columns must pass through one of the two bridging areas. Thus, the signal wires RX passing through the bridging area insulatively intersect the signal wires TX of the driving electrodes to form capacitive nodes. That is, in one of the two bridging areas, the signal wires TX intersecting the signal wires RX will increase capacitance at those nodes. In the other bridging area, however, there is no signal wires of the common sensing electrodes and no capacitive node is formed. Of course, no capacitance will generate at nodes. This causes an obvious difference of capacitances in the two bridging areas (please refer to FIG. 10). Such unbalanced capacitances at two symmetrical bridging areas will weaken sensitivity of the touch panel and add difficulty of design of the touch signal processor.

SUMMARY OF THE INVENTION

An object of the invention is to provide a single-layer projected capacitive touch sensor with two bridging areas, which can reduce a width of a bezel of a touch sensor and balance node capacitances in the two bridging areas.

To accomplish the above object, the single-layer projected capacitive touch sensor with two bridging areas of the invention includes sensing columns. Each sensing column has a common sensing electrode and driving electrodes. The driving electrodes are divided into two groups, which are connected to contacts in two bridging areas through electrode wires. Each bridging area is covered by an insulation film with through holes corresponding to the contacts. Signal wires of the driving electrodes pass through the through holes to connect the contacts of the driving electrodes of the sensing columns, which are located in a line, to form a signal channel. The signal wires connecting the common sensing electrodes pass through one of the two bridging areas and insulatively intersect the signal wires of the driving electrodes of the signal channel. Electrode extending portions of the common sensing electrodes are extended to the other bridging area to insulatively intersect signal wires of the driving electrodes of the signal channel.

DETAILED DESCRIPTION OF THE INVENTION

Figure 1:
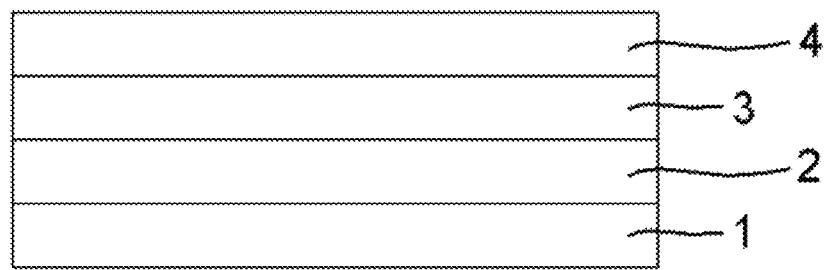
FIG. 1 is a schematic view showing lamination of the invention.

A preferred embodiment is depicted in the drawings. To make the invention more understandable, some elements in the drawings are not drawn in an accurate scale and sizes of some elements are enlarged with respect to other elements. For the sake of clearness, irrelative details are not drawn.

Figure 2:
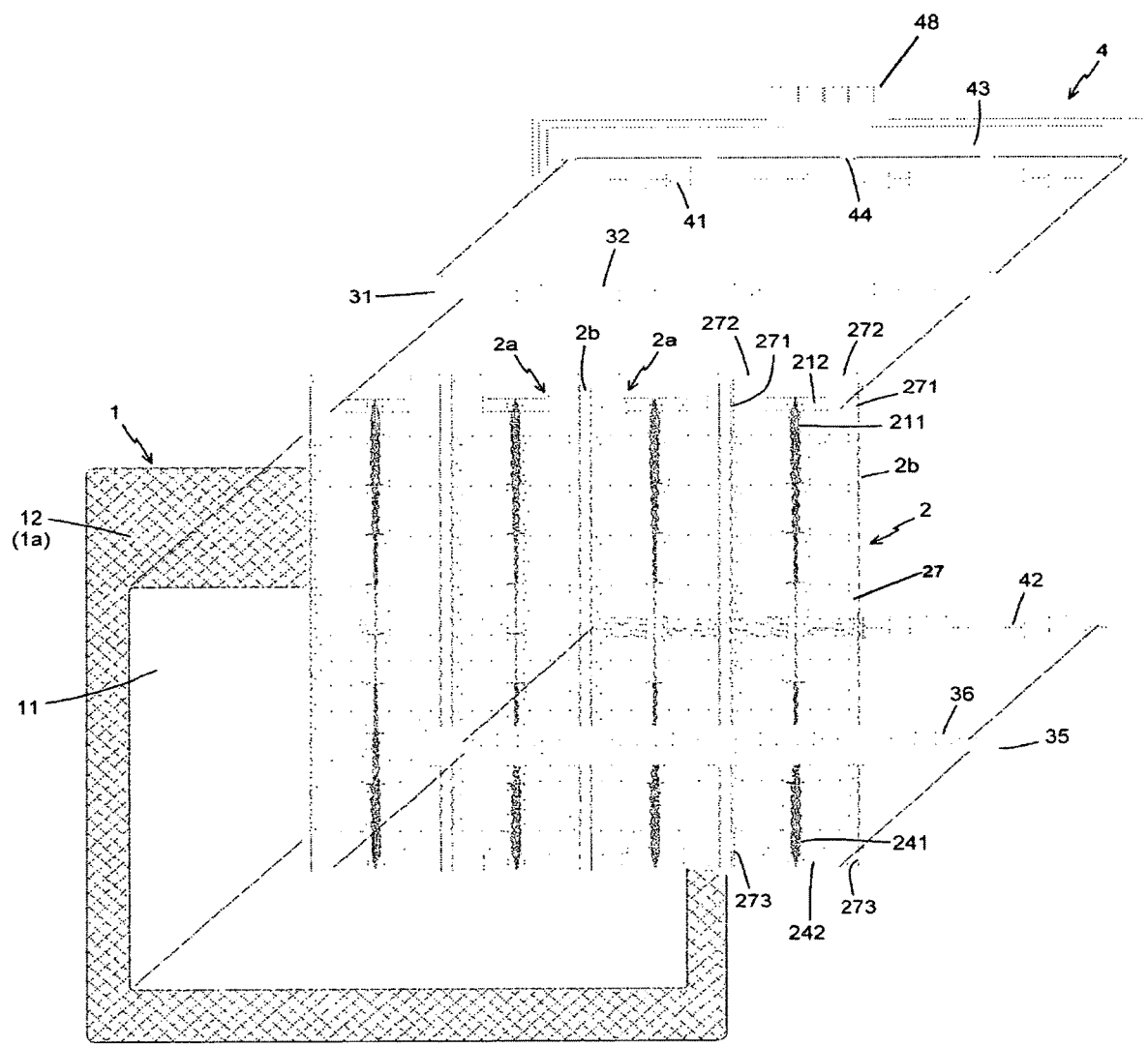
FIG. 2 is an exploded view of the invention.
Figure 3:
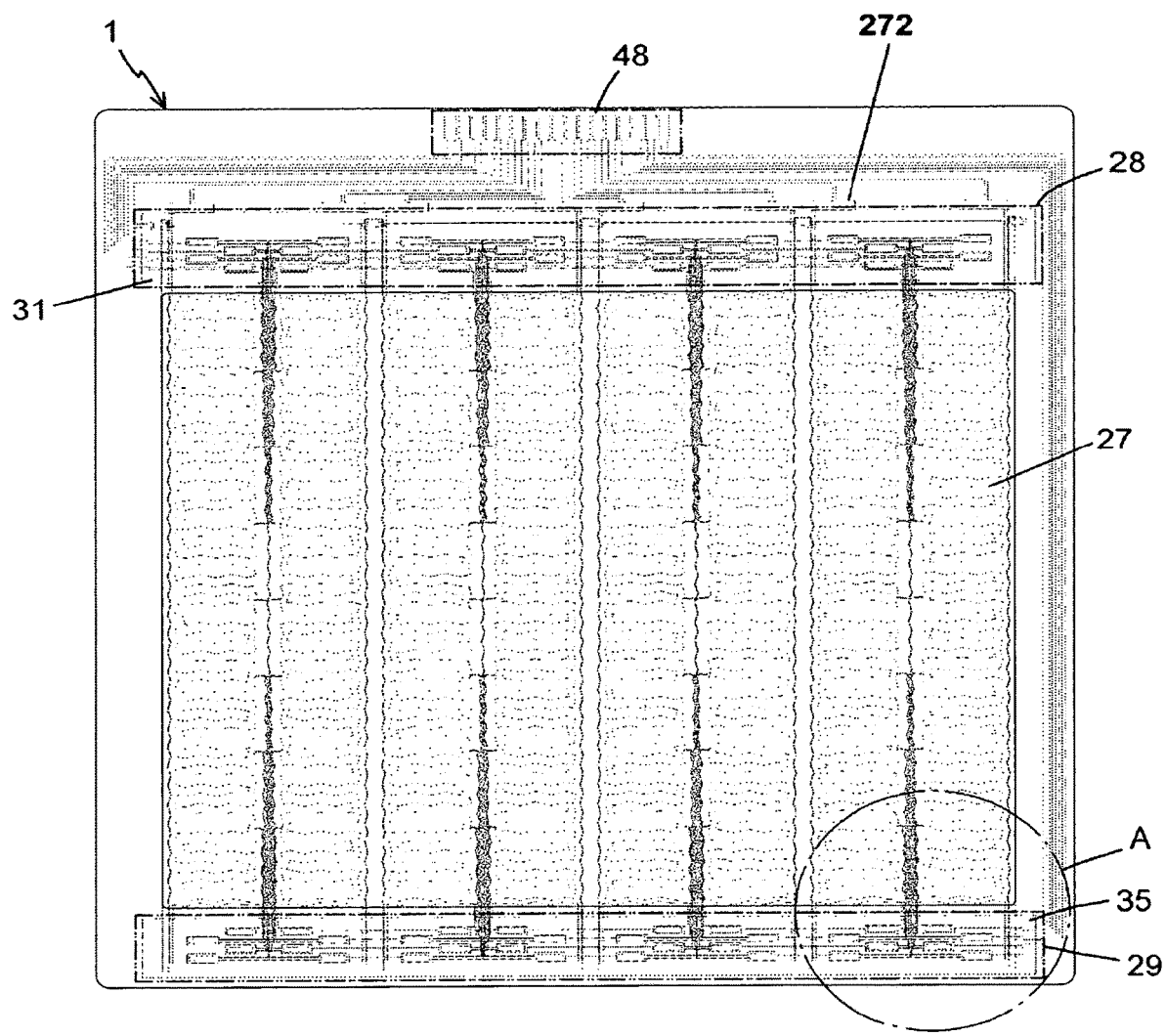
FIG. 3 is a plan view of the invention.

Please refer to FIGS. 1-3. The single-layer projected capacitive touch sensor of the invention includes a base layer 1, a transparent touch sensing layer 2, a bridging insulation layer 3 and a signal wire layer 4. The base layer 1 is a transparent thin plate with great mechanic strength and high transmittance, such as a glass plate or polymethylmethacrylate. Transparent flexible films are also available, such as a film of polyethylene terephthalate or polycarbonate, but not limited to these. A periphery of a surface of the base layer 1 has a bezel 1a which is formed by an insulative coating with low transmittance or opaqueness. The bezel 1a defines a shaded area 12 and a visible area 11 surrounded by the shaded area 12 on the base layer 1. The insulative coating may be ink or photoresist, but not limited to these.

The touch sensing layer 2 is made of a transparent conductive material such as indium tin oxide, indium zinc oxide, zinc aluminum oxide or polyethylene dioxythiophene, but not limited to these. The transparent touch sensing layer 2 is substantially based on independent-matrix sense elements and has sensing columns 2a and grounding columns 2b along a first direction (i.e. Y-axis direction). The sensing columns 2a are located within the visible area 11. In an embodiment of large-size touch sensor, the framework of independent-matrix sense elements includes sensing columns 2a and each sensing column 2a is composed of a common sensing electrode and driving electrodes, so the numerous driving electrodes are divided into an upper driving electrode group and a lower driving electrode group. As a result, the number of signal wires can be distributed to two areas to reduce both wiring space of the signal wires and a width of the bezel 1a.

Figure 4:
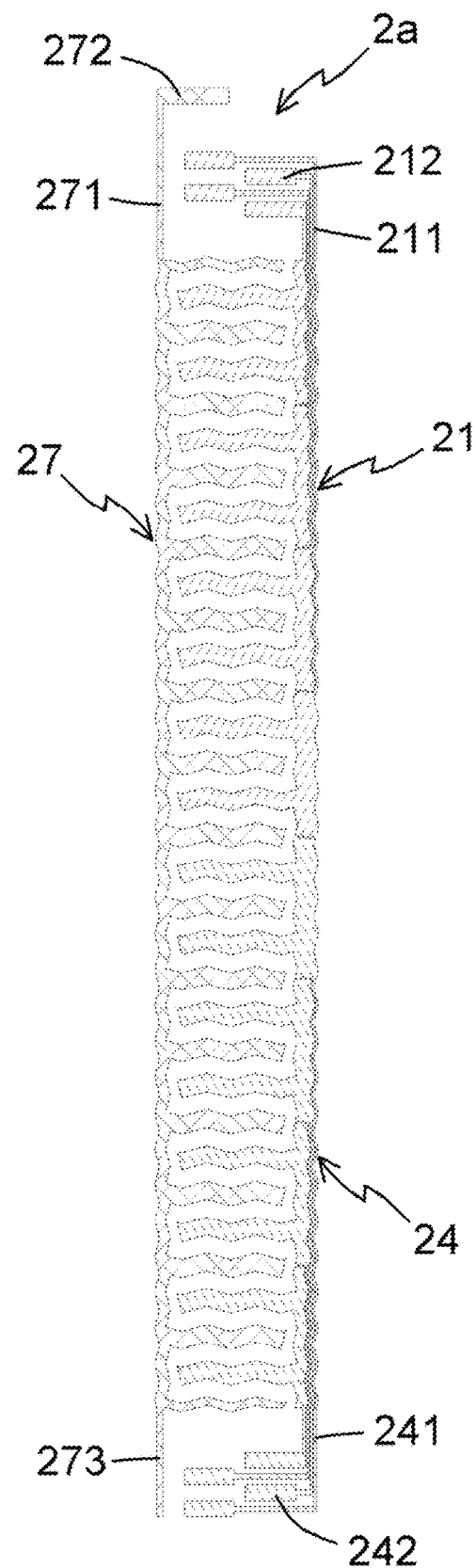
FIG. 4 is a plan view of the sensing column of the invention.

Please refer to FIG. 4. Each of the sensing columns 2a includes first upper sensing electrodes 21 (i.e., the upper driving electrode group), first lower sensing electrodes 24 (i.e., the lower driving electrode group) and a second sensing electrode 27 (i.e., sensing electrode). Each of the first upper sensing electrodes 21 and the first lower sensing electrodes 24 is of a short comb shape and has driving conductors extending along a second direction (i.e., X-axis direction). The second sensing electrode 27 is of a long comb shape and has sensing conductors extending along the second direction (i.e., X-axis direction). The first upper sensing electrodes 21, the first lower sensing electrodes 24 and the second sensing electrodes 27 are arranged in a complementary shape.

Each of the first upper sensing electrodes 21 is electrically connected to one of first upper contacts 212 disposed in an upper bridging area 28 through an electrode wire 211. Each of the first lower sensing electrodes 24 is electrically connected to one of first lower contacts 242 disposed in a lower bridging area 29 through an electrode wire 241. A first end (i.e., upper end) of the second sensing electrode 27 passes through the upper bridging area 28 and is electrically connected to a second contact 272 through an electrode wire 271. A second end (i.e., lower end) of the second sensing electrode 27 is provided with an electrode extending portion 273 located in the lower bridging area 29. A length of the electrode extending portion 273 exceeds a position of the lowermost one of the first lower contacts 242 or passes through the lower bridging area 29. The upper bridging area 28, the lower bridging area 29 and the second contacts 272 are located within the shaded area 12. A first end and a second end of the grounding column 2b are located in the upper bridging area 28 and the lower bridging area 29, respectively.

The bridging insulation layer 3 includes an upper bridging insulation film 31 and a lower bridging insulation film 35. The upper bridging insulation film 31 is attached on the upper bridging area 28 and is formed with through holes 32 separately corresponding to both the first upper contacts 212 and the first ends of the grounding columns 2b in position. The lower bridging insulation film 35 is attached on the lower bridging area 29 and is formed with through holes 36 separately corresponding to the first lower contacts 242 in position.

The signal wire layer 4 is located within the shaded area 12 and includes first upper signal wires 41 (i.e., upper driving signal wires), first lower signal wires 42, second signal wires 43 (i.e., lower driving signal wires), a grounding signal wire 44 and a signal output port 48. The first upper signal wires 41 are separately electrically connected to the first upper contacts 212 through the through holes 32 of the upper bridging insulation film 31. Each of the first upper signal wires 41 electrically connects the first upper contacts 212 of the sensing columns 2a, which (the first upper contacts 212) are located in a line along the second direction, to form a signal channel. The first upper signal wires 41 electrically connect to the signal output port 48 disposed at outermost position in the shaded area 12. The first lower signal wires 42 are separately electrically connected to the first lower contacts 242 through the through holes 36 of the lower bridging insulation film 35. Each of the first lower signal wires 42 electrically connects the first lower contacts 242 of the sensing columns 2a, which (the first lower contacts 242) are located in a line along the second direction, to form a signal channel. The first lower signal wires 42 electrically connect to the signal output port 48. Each of the second signal wires 43 separately electrically connects with one of the second contacts 272. The second signal wires 43 electrically connect to the signal output port 48. The grounding signal wire 44 is electrically connected with the first ends of the grounding columns 2b through the through holes 32 of the upper bridging insulation film 31 to connect the grounding columns 2b to form a signal channel. The grounding signal wire 44 is electrically connected to the signal output port 48. The signal wire layer 4 is made of conductive material such as gold, silver, copper, aluminum, molybdenum, nickel or an alloy of the above materials, or may be formed by printing with conductive silver paste or conductive ink, but not limited to these.

The invention utilizes the first upper signal wires 41, the first lower signal wires 42 and the second signal wires 43 to transmit signals carried on the first upper sensing electrodes 21, the first lower sensing electrodes 24 and the second sensing electrodes 27, respectively. Those signals are transmitted to the signal output port 48 and then sent to a signal processor via a flexible flat cable connected to the signal output port 48. In the invention, numerous driving electrodes are divided into two groups, an upper driving electrode group and a lower driving electrode group, and the two groups are separately wired to the upper and lower bridging areas 28, 29. As a result, the number of wires can be distributed to two opposite sides. By the arrangement of the upper and lower bridging insulation films 31, 35 with through holes 32, 36, the first upper contacts 212 and the first lower contacts 242 can be connected by the first upper signal wires 41 and the first lower signal wires 42 to form signal channels. This can effectively decrease the number of wires on the signal wire layer 4 and reduce a width of the shaded area 12. Also, the invention is suitable for application in touch panels with a narrow bezel.

Figure 5:
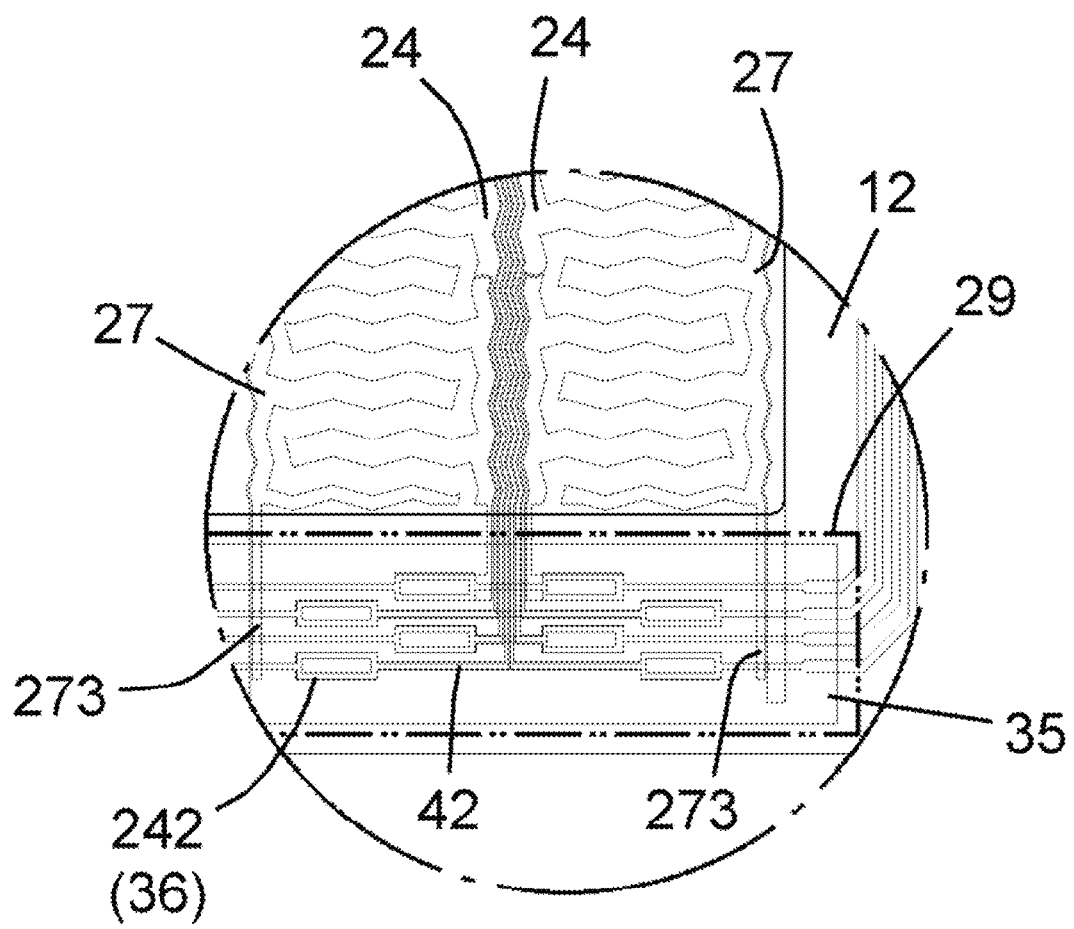
FIG. 5 is an enlarged view of circle A in FIG. 3.
Figure 6:
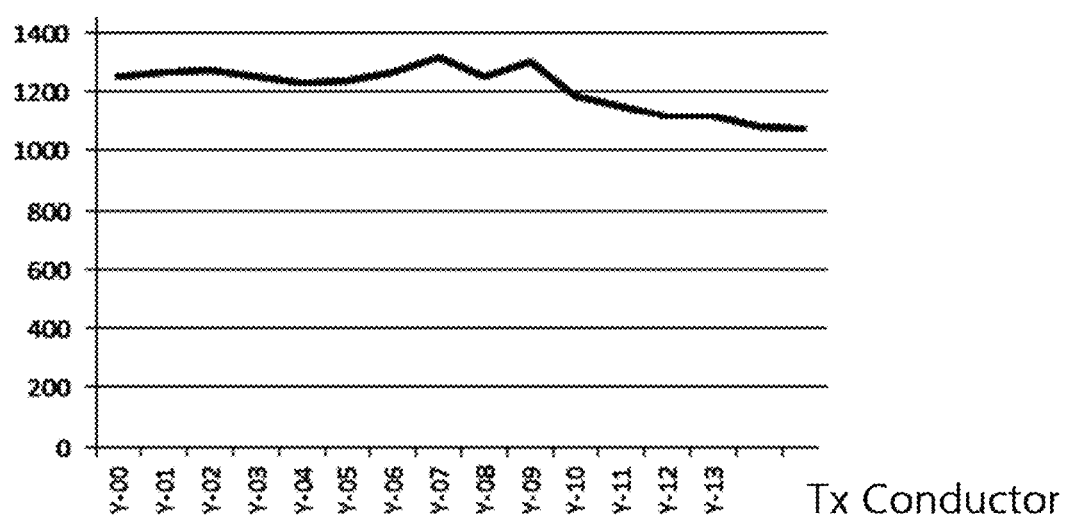
FIG. 6 is a distribution diagram of capacitance of nodes of the first upper signal wires and the first lower signal wires of the invention.
Figure 7:
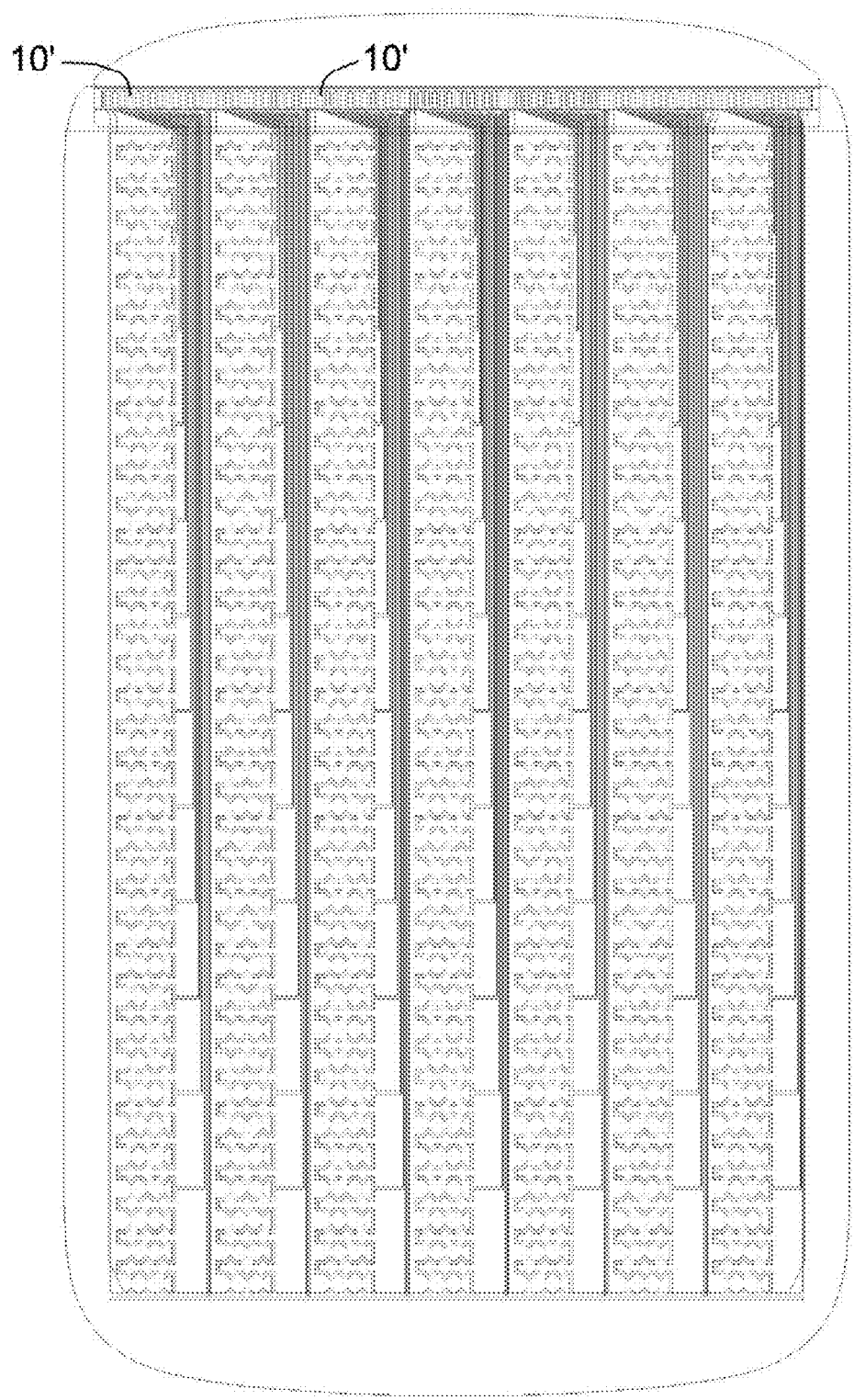
FIG. 7 is a plan view of a conventional touch sensor.
Figure 8:
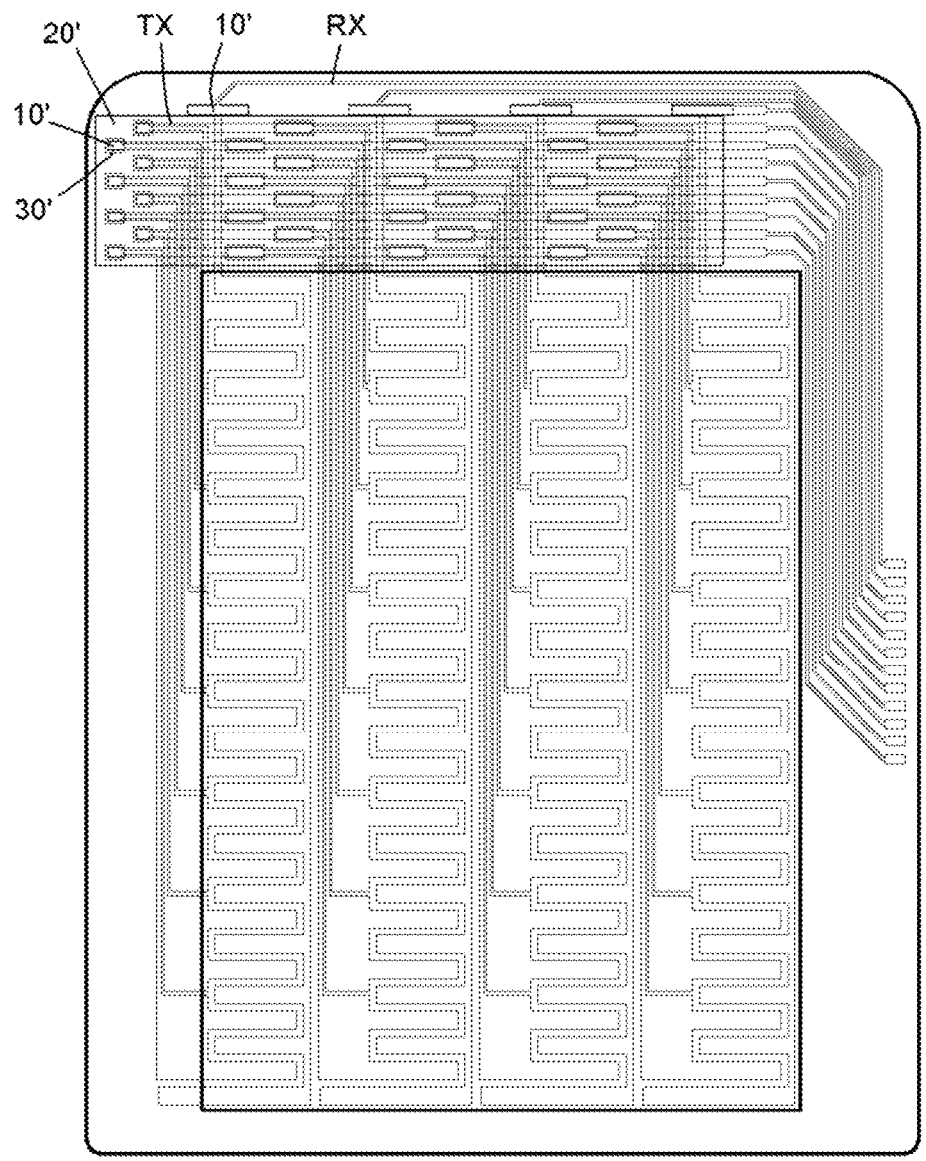
FIG. 8 is a plan view of another conventional touch sensor.
Figure 9:
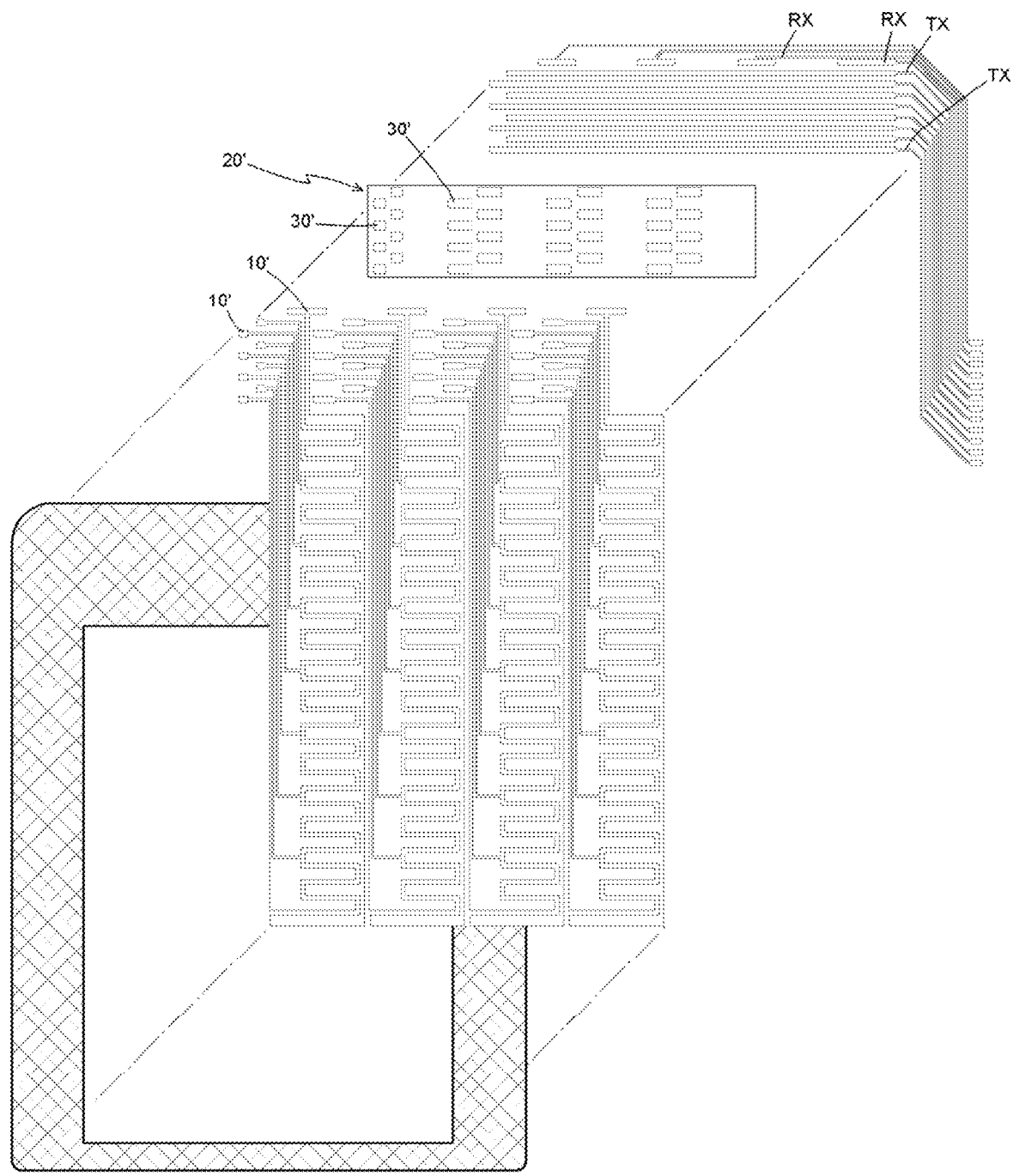
FIG. 9 is an explode view of the conventional touch sensor shown in FIG. 7.
Figure 10:
FIG. 10 is a distribution diagram of capacitance of nodes of the driving electrode signal wires in two bridging areas.

As shown in FIGS. 4 and 5, in the upper bridging area 28, intersections of the electrode wires 271 of the first ends of the second sensing electrodes 27 and the first upper signal wires 41 form capacitive nodes. Capacitance will increases at the capacitive nodes. Identically, in the lower bridging area 29, intersections of the electrode extending portions 273 of the second ends of the second sensing electrodes 27 and the first lower signal wires 42 form capacitive nodes. Capacitance will also increases at the capacitive nodes. Accordingly, signals carried on the first upper and lower signal wires 41, 42 in the upper and lower bridging areas 28, 29 will have approximately identical increases of capacitance as shown in FIG. 6. As a result, the two groups of driving electrodes can be balanced in capacitance of nodes.

What is claimed is:

1. A single-layer projected capacitive touch sensor comprising:
    a base layer, having a shaded area formed by a bezel and a transparent visible area surrounded by the shaded area;
    a touch sensing layer, attached on the base layer, based on independent-matrix sense elements with transmittance, having sensing columns and grounding columns, which are parallelly interlacedly arranged along a first direction at intervals, the sensing columns being located in the visible area, wherein each of the sensing columns comprises first upper sensing electrodes, first lower sensing electrodes and a second sensing electrode, each of the first upper sensing electrodes is electrically connected to one of first upper contacts disposed in an upper bridging area through an electrode wire, each of the first lower sensing electrodes is electrically connected to one of first lower contacts disposed in a lower bridging area through an electrode wire, both the upper bridging area and the lower bridging area are located in the shaded area, a first end of the second sensing electrode passes through the upper bridging area and is electrically connected to a second contact through an electrode wire, a second end of the second sensing electrode is provided with an electrode extending portion located in the lower bridging area and electrically connected with nothing, and a first end and a second end of each of the grounding columns are located in the upper bridging area and the lower bridging area, respectively;
    a bridging insulation layer, attached on the touch sensing layer, comprising an upper bridging insulation film and a lower bridging insulation film, wherein the upper bridging insulation film is attached on the upper bridging area and is formed with through holes separately corresponding to both the first upper contacts and the first ends of the grounding columns in position, the lower bridging insulation film is attached on the lower bridging area and is formed with through holes separately corresponding to the first lower contacts in position; and
    a signal wire layer, attached on the bridging insulation layer, disposed in the shaded area, comprising first upper signal wires, first lower signal wires, second signal wires, a grounding signal wire and a signal output port, wherein the first upper signal wires are separately electrically connected to the first upper contacts through the through holes of the upper bridging insulation film, each of the first upper signal wires electrically connects the first upper contacts of the sensing columns, which are located in a line along a second direction, to form a signal channel, the first upper signal wires electrically connect to the signal output port disposed at outermost position in the shaded area, the first lower signal wires are separately electrically connected to the first lower contacts through the through holes of the lower bridging insulation film, each of the first lower signal wires electrically connects the first lower contacts of the sensing columns, which are located in a line along the second direction, to form a signal channel, the first lower signal wires electrically connect to the signal output port, the second signal wires separately electrically connect with the second contacts, the second signal wires electrically connect to the signal output port, the grounding signal wire is electrically connected with the first ends of the grounding columns through the through holes of the upper bridging insulation film to connect the grounding columns to form a signal channel, and the grounding signal wire is electrically connected to the signal output port;
    wherein the electrode wires of the second sensing electrodes in the upper bridging area insulatively intersect the first upper signal wires, the electrode extension portions of the second sensing electrodes in the lower bridging area insulatively intersect the first lower signal wires, and intersections of the wires form capacitive nodes.

2. The single-layer projected capacitive touch sensor of claim 1, wherein the touch sensing layer is made of indium tin oxide, indium zinc oxide, zinc aluminum oxide or polyethylene dioxythiophene.

3. The single-layer projected capacitive touch sensor of claim 1, wherein both the first upper sensing electrodes and the first lower sensing electrodes are driving electrodes, and the second sensing electrodes are common sensing electrodes.

4. The single-layer projected capacitive touch sensor of claim 1, wherein the signal wire layer is made of conductive material such as gold, silver, copper, aluminum, molybdenum, nickel or an alloy thereof.

5. The single-layer projected capacitive touch sensor of claim 1, wherein the signal wire layer is formed by printing with conductive silver paste or conductive ink.

6. The single-layer projected capacitive touch sensor of claim 1, wherein the bezel is formed by an insulative coating with low transmittance or opaqueness, and the insulative coating is formed by ink or photoresist.

7. The single-layer projected capacitive touch sensor of claim 1, wherein the electrode extending portion is located in the lower bridging area, and a length of the electrode extending portion exceeds a position of the lowermost one of the first lower contacts.

8. The single-layer projected capacitive touch sensor of claim 1, wherein the electrode extending portion passes through the lower bridging area.

9. The single-layer projected capacitive touch sensor of claim 1, wherein the electrode extending portion is a straight line in shape.

* * * * *